United States Patent
Shan

(10) Patent No.: US 7,505,744 B1
(45) Date of Patent: Mar. 17, 2009

(54) DC OFFSET CORRECTION USING MULTIPLE CONFIGURABLE FEEDBACK LOOPS

(75) Inventor: Peijun Shan, Beaverton, OR (US)

(73) Assignee: RF Micro Devices, Inc., Greensboro, NC (US)

( * ) Notice: Subject to any disclaimer, the term of this patent is extended or adjusted under 35 U.S.C. 154(b) by 413 days.

(21) Appl. No.: 11/191,840

(22) Filed: Jul. 28, 2005

(51) Int. Cl.
*H04B 1/10* (2006.01)
*H04B 7/00* (2006.01)

(52) U.S. Cl. .................. 455/130; 455/232.1; 455/283; 455/296; 375/319

(58) Field of Classification Search ... 455/232.1–251.1, 455/283, 296, 63.1, 317, 323–325; 375/317–319
See application file for complete search history.

(56) References Cited

U.S. PATENT DOCUMENTS

| | | | | |
|---|---|---|---|---|
| 5,459,679 | A | 10/1995 | Ziperovich | 364/602 |
| 5,566,213 | A * | 10/1996 | Carsello | 375/344 |
| 5,584,059 | A | 12/1996 | Turney et al. | 455/126 |
| 6,166,668 | A | 12/2000 | Bautista et al. | 341/118 |
| 6,225,848 | B1 | 5/2001 | Tilley et al. | 327/307 |
| 6,317,064 | B1 | 11/2001 | Ferrer et al. | 341/118 |
| 6,321,073 | B1 | 11/2001 | Luz et al. | 455/239.1 |
| 6,459,889 | B1 * | 10/2002 | Ruelke | 455/296 |
| 6,509,777 | B2 | 1/2003 | Razavi et al. | 327/307 |
| 6,816,718 | B2 | 11/2004 | Yan et al. | 455/317 |
| 6,903,606 | B1 | 6/2005 | Yan et al. | 330/9 |
| 6,941,121 | B2 | 9/2005 | Chen | 455/232.1 |
| 7,266,359 | B2 * | 9/2007 | Chen et al. | 455/296 |
| 7,272,178 | B2 * | 9/2007 | Rahman et al. | 375/240 |
| 7,286,312 | B1 * | 10/2007 | Oberg | 360/39 |
| 2002/0151289 | A1 * | 10/2002 | Rahman et al. | 455/232.1 |
| 2003/0133518 | A1 | 7/2003 | Koomullil et al. | 375/326 |
| 2003/0199264 | A1 * | 10/2003 | Holenstein et al. | 455/324 |
| 2003/0231054 | A1 * | 12/2003 | Magoon et al. | 330/9 |
| 2004/0081256 | A1 * | 4/2004 | Shi et al. | 375/317 |
| 2004/0229580 | A1 * | 11/2004 | Chen | 455/130 |
| 2005/0111525 | A1 * | 5/2005 | Driesen et al. | 375/147 |
| 2005/0208919 | A1 * | 9/2005 | Walker et al. | 455/296 |
| 2005/0277396 | A1 * | 12/2005 | Pipilos | 455/253.2 |
| 2006/0010361 | A1 * | 1/2006 | Lin | 714/747 |
| 2006/0227910 | A1 * | 10/2006 | Ramasubramanian et al. | 375/346 |
| 2006/0269003 | A1 * | 11/2006 | Hammerschmidt et al. | 375/260 |
| 2006/0280268 | A1 * | 12/2006 | Sobchak et al. | 375/349 |
| 2007/0171999 | A1 * | 7/2007 | Edde et al. | 375/319 |

* cited by examiner

*Primary Examiner*—Simon D Nguyen
(74) *Attorney, Agent, or Firm*—Withrow & Terranova, P.L.L.C.

(57) ABSTRACT

The present invention provides a DC offset correction system for a wireless communication device that removes a DC offset from a baseband receive signal during "training time" when the baseband receive signal should ideally have no DC content. In general, the DC offset correction system includes multiple configurable feedback loops that operate to remove or cancel the DC offset from the baseband receive signal. One or more of the multiple configurable feedback loops is activated for a period of time during operation when it is known that the received signal should ideally contain no DC content. This training time varies depending on the particular communication standard being used by the wireless communication device. For example, the training time may be during reception of the preamble and header of an IEEE 802.11 packet.

20 Claims, 2 Drawing Sheets

DC OFFSET CORRECTION USING MULTIPLE CONFIGURABLE FEEDBACK LOOPS

FIELD OF THE INVENTION

Figure 1:
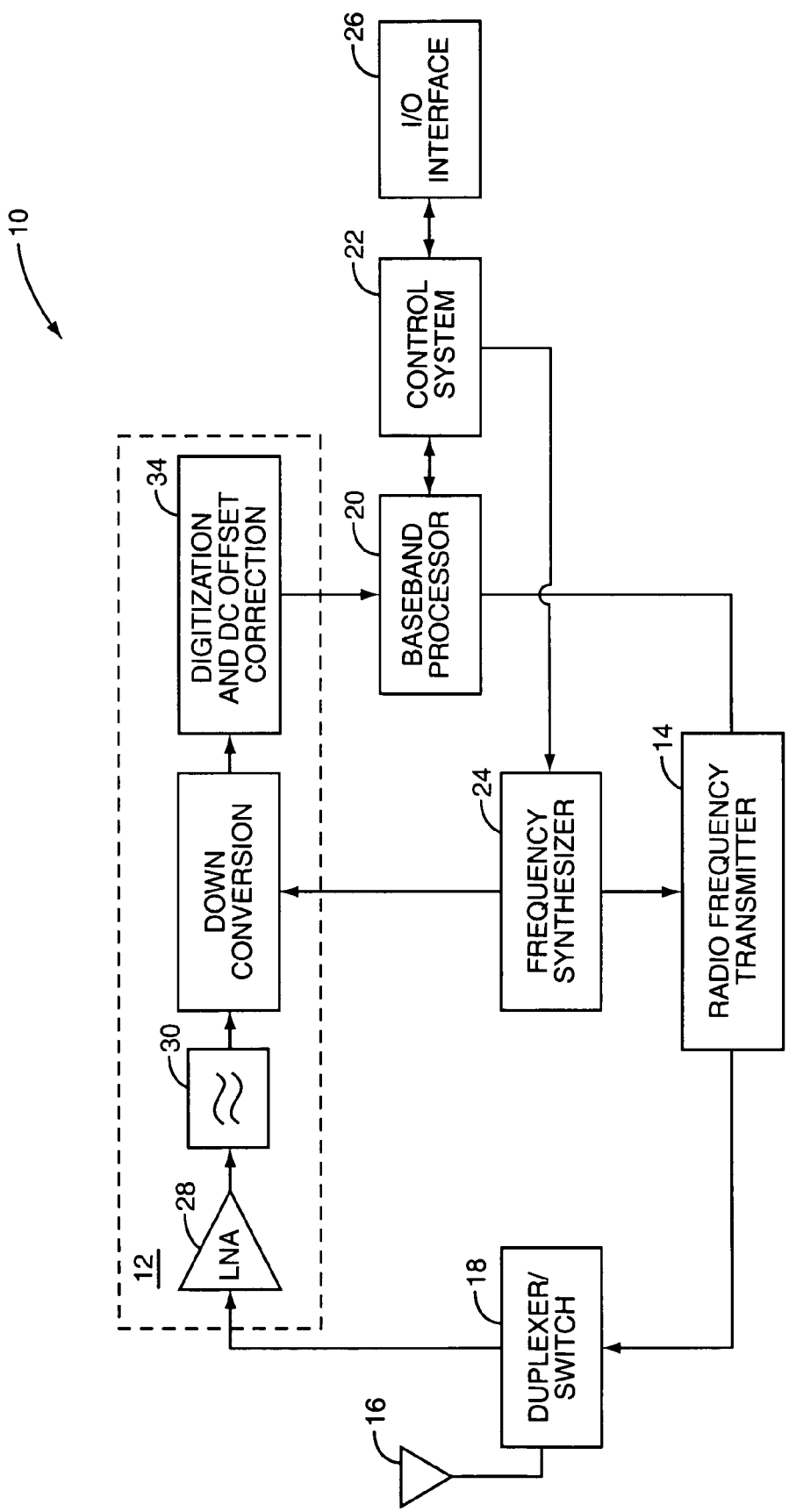

The present invention relates to a wireless communication system, and more particularly to DC offset correction using multiple configurable feedback loops and performed during "training time" having no DC content.

BACKGROUND OF THE INVENTION

A common problem in wireless communication receivers is DC offset. This is especially a concern in Direct Conversion Receivers (DCRs) where received radio frequency (RF) signals are converted directly to baseband using a local oscillator (LO) signal having a frequency equal to the frequency of the received RF signals. When downconverting the RF signals, the LO signal leaks to the inputs of mixers used to downconvert the RF signals, thereby creating a DC offset error associated with downconversion. Accordingly, there remains a need for a DC offset correction system that corrects DC offset errors caused by LO leakage as well as any other DC offsets in a receiver for a wireless communication system.

SUMMARY OF THE INVENTION

The present invention provides a DC offset correction system for a wireless communication device that removes a DC offset from a baseband receive signal during "training time" when the baseband receive signal should ideally have no DC content. In general, the DC offset correction system includes multiple configurable feedback loops that operate to remove, or cancel, the DC offset from the baseband receive signal. One or more of the multiple configurable feedback loops is activated, or set to a tracking mode of operation, for a period of time during reception when it is known that the received signal should ideally contain no DC content. This training time varies depending on the particular communication standard being used by the wireless communication device. For example, one or more of the multiple configurable feedback loops may be set to a tracking mode during reception of the preamble and header of an IEEE 802.11 packet when the baseband receive signal should ideally have no DC content.

The DC offset correction system is configured to have a DC notch filter transfer function. Thus, when one or more of the multiple configurable feedback loops are activated, the DC offset correction system removes the DC offset and does not interfere with the reception of information contained in the baseband receive signal at a frequency above the cut-off frequency defined by the transfer function of the DC offset correction system. At some time before the end of the training time, the multiple configurable feedback loops are deactivated, or set to a hold mode of operation, such that a DC offset correction provided by the DC offset correction system is held constant.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 2:
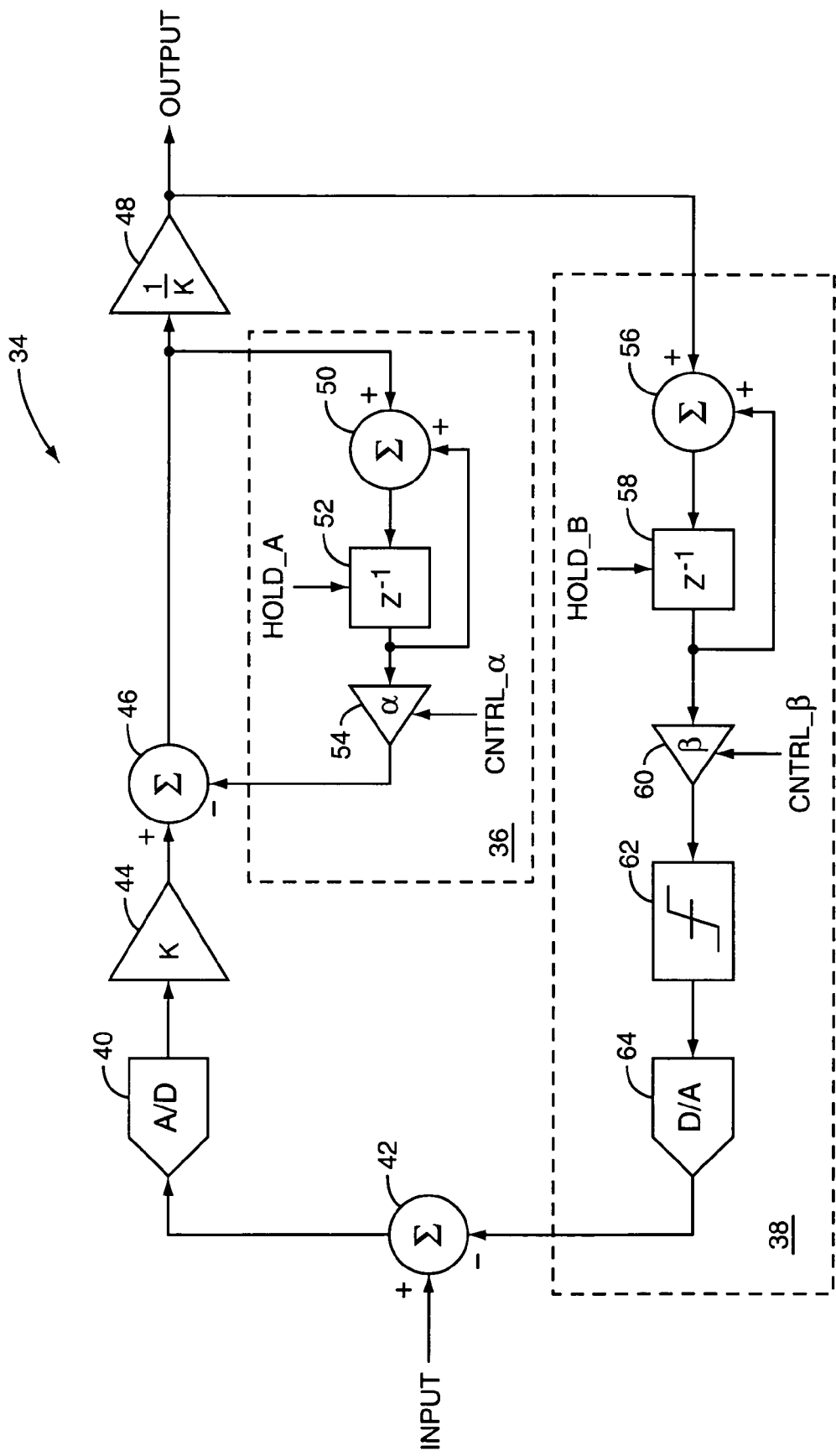

FIG. 1 illustrates an exemplary embodiment of a mobile terminal including DC offset correction circuitry of the present invention; and FIG. 2 illustrates an exemplary embodiment of the DC offset correction circuitry of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

While the present invention is particularly well-suited for use in a mobile terminal, and particularly a mobile terminal that operates according to the IEEE 802.11 standard, it should be appreciated that the present invention may be used in any wireless receiver operating according to a standard such as, but not limited to, the Global System for Mobile Communications (GSM) standard, the Time Division Multiple Access (TDMA) standard, the Code Division Multiple Access (CDMA) standard, the Wideband CDMA (WCDMA) standard, or the like, wherein the standard may define a "training time" during which received signals should have no DC content when downconverted to baseband.

The present invention is preferably incorporated in a mobile terminal 10, such as a mobile telephone, personal digital assistant, Wireless Local Area Network (WLAN) device, or the like. The basic architecture of a mobile terminal 10 is represented in FIG. 1, and may include a receiver front end 12, a radio frequency transmitter 14, an antenna 16, a duplexer or switch 18, a baseband processor 20, a control system 22, a frequency synthesizer 24, and an interface 26. The receiver front end 12 receives information-bearing radio frequency signals from one or more remote transmitters (not shown). A low noise amplifier (LNA) 28 amplifies the received signal. A filter circuit 30 minimizes broadband interference in the received signal, while downconversion circuitry 32 downconverts the filtered, received signal to a baseband signal. The baseband signal is then digitized and DC offset correction is performed by digitization and DC offset correction circuitry 34. The receiver front end 12 typically uses one or more mixing frequencies generated by the frequency synthesizer 24.

The baseband processor 20 processes the digitized, received signal to extract the information or data bits conveyed in the received signal. This processing typically comprises demodulation, decoding, and error correction operations. As such, the baseband processor 20 is generally implemented in an Application Specific Interacted Circuit (ASIC) or one or more digital signal processors (DSPs).

On the transmit side, the baseband processor 20 receives digitized data from the control system 22, which it modulates for transmission. The control system 22 may run software stored in memory. Alternatively, the operation of the control system 22 may be a function of sequential logic structures as is well understood. After modulating the data from the control system 22, the baseband processor 20 outputs the modulated data to the radio frequency transmitter 14. The radio frequency transmitter 14 operates to convert the modulated data into a radio frequency transmit signal at the desired output power level for transmission via antenna.

A user may interact with the mobile terminal 10 via the interface 26. In order to communicate with the user, the interface 26 may include devices such as, but not limited to, a microphone, a speaker, a keypad, and/or a display. Additionally, it may include a voice encoder/decoder, in which case it may communicate directly with the baseband processor 20.

FIG. 2 illustrates the digitization and DC offset correction circuitry 34 according to one embodiment of the present invention. In general, the digitization and DC offset correction circuitry 34 includes multiple configurable feedback loops that operate to remove or cancel the DC offset from the input signal (INPUT), which is the output of the downconversion circuitry 32 (FIG. 1). One or more of the multiple configurable feedback loops is activated, or configured to be in a tracking mode of operation, for a period of time during operation when it is known that the received signal should ideally contain no DC content. This training time varies depending on the particular communication standard being used by the mobile terminal 10 (FIG. 1). For example, one or more of the multiple configurable feedback loops may be activated during reception of the preamble and header of an IEEE 802.11 packet. During reception of the preamble and header of an IEEE 802.11 packet, the baseband signal provided by the downconversion circuitry 32 (FIG. 1) should ideally have no DC content.

During this training time, one or more of the multiple configurable feedback loops is in tracking mode and operates to remove or cancel the DC offset from the input signal. Further, as discussed below in detail, the digitization and DC offset correction circuitry 34 has a DC notch filter transfer function when one or more of the multiple configurable feedback loops is in the tracking mode. Thus, the digitization and DC offset correction circuitry 34 does not interfere with the reception of a signal, such as the preamble and header of an IEEE 802.11 packet, at a frequency above the cut-off frequency defined by the transfer function of the digitization and DC offset correction circuitry 34. At some time before the end of the training time, the multiple configurable feedback loops of the digitization and DC offset correction circuitry 34 are deactivated, or configured to be in a hold mode of operation, such that a DC offset correction provided by the digitization and DC offset correction circuitry 34 is held constant.

In this embodiment, the digitization and DC offset correction circuitry 34 includes a configurable digital feedback loop 36, a configurable analog feedback loop 38, and an analog-to-digital (A/D) converter 40. The configurable digital feedback loop 36 is more generally referred to herein as a configurable inner feedback loop, and the configurable analog feedback loop 38 is more generally referred to herein as a configurable outer feedback loop. Further, because the configurable digital feedback loop 36 is within the configurable analog feedback loop 38, the configurable digital and analog feedback loops 36 and 38 are referred to as nested configurable feedback loops.

The input signal (INPUT), which is the analog baseband signal output by the downconversion circuitry 32 (FIG. 1), is provided to differencing, or subtraction, circuitry 42. The differencing circuitry 42 operates to provide a corrected analog input signal based on removing or subtracting an analog DC offset correction signal from the input signal (INPUT). As discussed below in detail, when the configurable analog feedback loop 38 is enabled, the analog DC offset correction signal is generated by the configurable analog feedback loop 38 to remove essentially all or a portion of a DC offset from the input signal (INPUT). The configurable analog feedback loop 38 may be in a tracking mode where the analog DC offset correction signal is adjusted to remove the DC offset or in a hold mode where the analog DC offset correction signal is held constant.

The output of the differencing circuitry 42, which is referred to herein as a corrected analog input signal is provided to the A/D converter 40. The A/D converter 40 digitizes the corrected analog input signal to provide a digitized signal. The digitized signal is scaled by scaling circuitry 44 having a predetermined, or optionally controllable, scaling factor (K). The scaled signal is provided from the scaling circuitry 44 to differencing circuitry 46. The differencing circuitry 46 provides a corrected digital signal based on removing or subtracting a digital DC offset correction signal generated by the configurable digital feedback loop 36 from the output of the scaling circuitry 44. When the configurable digital feedback loop 36 is enabled, the digital DC offset correction signal is generated by the configurable digital feedback loop 36 to remove essentially all or a portion of a DC offset from the input signal (INPUT). The configurable digital feedback loop 36 may be in a tracking mode where the digital DC offset correction signal is adjusted to remove the DC offset or in a hold mode where the digital DC offset correction signal is held constant.

The corrected digital signal output by the differencing circuitry 46 is provided to scaling circuitry 48 having a predetermined, or optionally controllable, scaling factor of 1/K. It should be noted that scaling circuitries 44 and 48 are optional and thus are not necessary for the present invention. The output signal (OUTPUT) provided at the output of the scaling circuitry 48, which is the output of the digitization and DC offset correction circuitry 34, is digital version of the input signal (INPUT) having been compensated to remove, or cancel, the DC offset of the receiver front end 12 (FIG. 1).

The configurable digital feedback loop 36 is essentially a low-pass filter that operates to low-pass filter the output of the differencing circuitry 46 to provide the digital offset correction signal, where the digital offset correction signal is proportional to the DC content of the output of the differencing circuitry 46. In this embodiment, the configurable digital feedback loop 36 includes digital accumulation circuitry formed by summation circuitry 50 and delay circuitry 52, arranged as shown. The digital accumulation circuitry operates to low-pass filter the corrected digital signal provided by differencing circuitry 46. The filtered signal is scaled by scaling circuitry 54 having a controllable scaling factor ($\alpha$). The controllable scaling factor ($\alpha$) of the scaling circuitry 54 may be controlled, for example, by control system 22 or baseband processor 20.

The configurable digital feedback loop 36 is enabled or disabled by controlling the scaling factor ($\alpha$) of the scaling circuitry 54, and set to either the tracking mode or hold mode by hold signal (HOLD_A). For example, the scaling factor ($\alpha$) of the scaling circuitry 54 may be set to zero to disable the configurable digital feedback loop 36 such that the digital DC offset correction signal provided to the differencing circuitry 46 is always zero. On the other hand, the scaling factor ($\alpha$) of the scaling circuitry 54 may be set to a value such as $\frac{1}{512}$ in order to enable the configurable digital feedback loop 36. Note that the scaling factor ($\alpha$) also controls the sharpness of the cut-off transient of the low-pass filter formed by summation circuitry 50 and delay circuitry 52. In contrast, the hold signal (HOLD_A) is set to a first state to place the configurable digital feedback loop 36 in tracking mode where the output of the configurable digital feedback loop 36 is active. The configurable digital feedback loop 36 is placed in the tracking mode during training times when it is desirable to remove DC content from the input signal (INPUT). The hold signal (HOLD_A) is set to a second state to place the configurable digital feedback loop 36 in the hold mode such that the output of the delay circuitry 52, and thus the digital DC offset correction signal provided to the differencing circuitry 46, is held constant.

The configurable analog feedback loop 38 is essentially a low-pass filter that operates to low-pass filter the output signal (OUTPUT) to provide the analog offset correction signal, where the analog offset correction signal is proportional to the DC content of the output signal (OUTPUT). In this embodiment, the configurable analog feedback loop 38 includes digital accumulation circuitry formed by summation circuitry 56 and delay circuitry 58, arranged as shown. The digital accumulation circuitry operates to low-pass filter the output signal (OUTPUT). The filtered signal from the delay circuitry 58 is scaled by scaling circuitry 60 having a controllable scaling factor ($\beta$). The controllable scaling factor ($\beta$) of the scaling circuitry 60 may be controlled, for example, by control system 22 or baseband processor 20.

The configurable analog feedback loop 38 is enabled or disabled by controlling the scaling factor ($\beta$) of the scaling circuitry 60, and set to either the tracking mode or hold mode by hold signal (HOLD_B). For example, the scaling factor ($\beta$) of the scaling circuitry 60 may be set to zero to disable the configurable analog feedback loop 38 such that the analog DC offset correction signal provided to the differencing circuitry 42 is always zero. On the other hand, the scaling factor ($\beta$) of the scaling circuitry 60 may be set to a value such as 1/512 in order to enable the configurable analog feedback loop 38. Note that the scaling factor ($\beta$) also controls the sharpness of the cut-off transient of the low-pass filter formed by summation circuitry 56 and delay circuitry 58. In contrast, the hold signal (HOLD_B) is set to a first state to place the configurable analog feedback loop 38 in an active mode. The configurable analog feedback loop 38 is placed in active mode during training times when it is desirable to remove DC content from the input signal (INPUT). The hold signal (HOLD_B) is set to a second state to place the configurable analog feedback loop 38 in an inactive state such that the output of the delay circuitry 58, and thus the analog DC offset correction signal provided to the differencing circuitry 42, is held constant.

Limiting circuitry 62 operates to limit the input of digital-to-analog (D/A) converter 64 to a known maximum input value of the D/A converter. More specifically, the limiting circuitry 62 receives the output of the scaling circuitry 60. If the output of the scaling circuitry 60 is less than or equal to the maximum input value of the D/A converter, then the scaling circuitry 60 simply passes the output of the scaling circuitry 60 to the input of the D/A converter 64. However, if the output of the scaling circuitry 60 is greater than the maximum input value of the D/A converter 64, the limiting circuitry 62 provides the maximum input value to the D/A converter 64, thereby limiting the input of the D/A converter 64 to the known maximum input value.

The transfer function of the digitization and DC offset correction circuitry 34 of FIG. 2 is:

$$H(z) = \frac{1 - z^{-1}}{1 - (1-\alpha)z^{-1} + \beta z^{-(D+1)}},$$

where D is a predetermined or selectable integer defining the delay of the D/A converter 64. As will be apparent to one of ordinary skill in the art, the transfer function of the digitization and DC offset correction circuitry 34 is that of a DC notch filter. This is true whether one or both of the configurable digital feedback loop 36 and the configurable analog feedback loop 38 is enabled. As such, when one or both of the configurable digital feedback loop 36 and the configurable analog feedback loop 38 is enabled, the digitization and DC offset correction circuitry 34 operates to remove essentially all DC content from the input signal (INPUT). Frequencies other than DC pass through the digitization and DC offset correction circuitry 34. Thus, if the configurable digital and analog feedback loops 36 and 38 are enabled during reception of the preamble and header of an IEEE 802.11 packet, which ideally contains no DC content, the digitization and DC offset correction circuitry 34 operates to remove the DC content from the input signal (INPUT), thereby correcting the DC offset of the receiver front end 12 (FIG. 1), without interfering with the reception of the preamble and header of the IEEE 802.11 packet.

In operation, when it is desirable to adjust the digital and analog DC offset correction signals, such as at start-up or at periodic times after start-up, one or both of the configurable digital and analog feedback loops 36 and 38 are enabled and set to the tracking mode of operation during a training time. More specifically, the configurable digital feedback loop 36 may be enabled by setting the scaling factor ($\alpha$) of the scaling circuitry 54 to a value other than zero, such as 1/512, and set to the tracking mode by providing the hold signal (HOLD_A) such that the output of the delay circuitry 52 is active, or not held constant. Similarly, the configurable analog feedback loop 38 may be enabled by setting the scaling factor ($\beta$) of the scaling circuitry 60 to a value other than zero, such as 1/512, and set to the tracking mode by providing the hold signal (HOLD_B) such that the output of the delay circuitry 58 is active, or not held constant.

Once one or both of the configurable digital and analog feedback loops 36 and 38 is set to the tracking mode and enabled, the digital and/or analog DC offset correction signals are adjusted such that the DC offset is removed from the input signal (INPUT). At some time before the end of the training time, the configurable digital and analog feedback loops 36 and 38 are set to the hold mode of operation such that the digital and analog DC offset correction signals are held constant. Thereafter, the digitization and DC offset correction circuitry 34 uses the constant values of the digital and analog DC offset correction signals to remove the DC offset from the input signal (INPUT).

In one embodiment, the configurable digital feedback loop 36 and the configurable analog feedback loop 38 may have different scales and resolutions. The configurable digital feedback loop 36 may have a large scale and coarse resolution, and the configurable analog feedback loop 38 may have a small scale and fine resolution. For example, the configurable digital feedback loop 36 may have a scale of 30 mV (millivolts) with a resolution of 2 mV, and the configurable analog digital feedback loop 38 may have a scale of 3 mV with a resolution of 0.2 mV. However, the configurable digital and analog feedback loops 36 and 38 may have any desired scale and resolution.

In the embodiment where the configurable digital feedback loop 36 has a large scale and coarse resolution and the configurable analog feedback loop 38 has a small scale and fine resolution, both the configurable digital and analog feedback loops 36 and 38 may initially be used to obtain initial values for the digital and analog DC offset correction signals. Thereafter, only the configurable analog feedback loop 38 may be periodically activated to readjust the analog DC offset correction signal to compensate for slight variations in the DC offset of the receiver front end 12 (FIG. 1). The configurable digital feedback loop 36 may be activated if a variation in the DC offset of the receiver front end 12 (FIG. 1) occurs that is large enough to move the DC offset outside the scale of the configurable analog feedback loop 38. For example, if the scale of the configurable analog feedback loop 38 is 3 mV and the DC offset varies by an amount greater than 3 mV, the configurable digital feedback loop 36 may be activated.

Accordingly, the digitization and DC offset correction circuitry 34 may operate in one of four modes of operation depending on the configuration of the configurable digital and analog feedback loops 36 and 38. In a digital mode, the configurable digital feedback loop 36 is enabled, and the configurable analog feedback loop 38 is disabled. In an analog mode, the configurable analog feedback loop 38 is enabled, and the configurable digital feedback loop 36 is disabled. In a digital and analog mode of operation, both the configurable digital feedback loop 36 and the configurable analog feedback loop 38 are enabled. Lastly, in a no-correction mode, both the configurable digital feedback loop 36 and the configurable analog feedback loop 38 are disabled.

The digitization and DC offset correction circuitry 34 of the present invention has substantial opportunity for variation without departing from the spirit or scope of the present invention. For example, downconversion circuitry 32 (FIG. 1) may provide a quadrature baseband signal. In order to remove the DC offset from both the in-phase and quadrature-phase components of the quadrature baseband signal, the mobile terminal 10 may include first digitization and DC offset correction circuitry 34 to remove the DC offset from the in-phase component and second digitization and DC offset correction circuitry 34 to remove the DC offset from the quadrature component.

Those skilled in the art will recognize improvements and modifications to the preferred embodiments of the present invention. All such improvements and modifications are considered within the scope of the concepts disclosed herein and the claims that follow.

What is claimed is:

1. A DC offset correction system for removing a DC offset of a wireless receiver comprising:
   a plurality of nested configurable feedback loops each configurable to operate in either a tracking mode or a hold mode and adapted to:
   a) track a DC offset of a baseband input signal provided by the wireless receiver to provide a DC offset correction signal when in the tracking mode; and
   b) hold the DC offset correction signal constant when in the hold mode;
   wherein at least one of the plurality of nested configurable feedback loops is configured in the tracking mode of operation during training time when the baseband input signal should have no DC content.

2. The system of claim 1 wherein the at least one of the plurality of nested configurable feedback loops is switched to the hold mode of operation at or before an end of the training time.

3. The system of claim 1 further comprising:
   first differencing circuitry adapted to combine the baseband signal and a first DC offset correction signal to provide a corrected input signal; and
   second differencing circuitry adapted to combine the corrected input signal and a second DC offset correction signal to provide an output signal;
   wherein the plurality of nested configurable feedback loops comprise:
   a configurable outer feedback loop adapted to low-pass filter the output signal to provide the first DC offset correction signal when the configurable outer feedback loop is in a tracking mode of operation, and hold the first DC offset correction signal constant when the configurable outer feedback loop is in a hold mode of operation; and
   a configurable inner feedback loop adapted to low-pass filter the output signal to provide the second DC offset correction signal when the configurable inner feedback loop is in a tracking mode of operation, and hold the second DC offset correction signal constant when the configurable inner feedback loop is in a hold mode of operation.

4. The system of claim 3 wherein both the configurable outer feedback loop and the configurable inner feedback loop are configured in the tracking mode of operation during training time when the baseband signal should have no DC content.

5. The system of claim 3 wherein one of the configurable inner and outer feedback loops has a smaller scale and finer resolution than another of the configurable inner and outer feedback loops.

6. The system of claim 3 wherein the configurable outer feedback loop is a configurable analog feedback loop such that the first DC offset correction signal is an analog DC offset correction signal, and the configurable inner feedback loop is a configurable digital feedback loop such that the second DC offset correction signal is a digital DC offset correction signal.

7. The system of claim 6 wherein the DC offset correction system is configurable to operate in one of an analog mode where the configurable analog feedback loop is enabled and the configurable digital feedback loop is disabled, a digital mode where the configurable analog feedback loop is disabled and the configurable digital feedback loop is enabled, an analog and digital mode where both the configurable analog and digital feedback loops are enabled, or a no-correction mode where both the configurable analog and digital feedback loops are disabled.

8. The system of claim 6 wherein the DC offset correction system further comprises digitization circuitry adapted to digitize the corrected input signal to provide a digitized corrected input signal such that the second differencing circuitry combines the digitized corrected input signal and the digital DC offset correction signal to provide the output signal.

9. The system of claim 8 wherein the DC offset correction system further comprises:
   first scaling circuitry having a first scaling factor (K) and adapted to scale the digitized corrected input signal to provide a scaled signal such that the second differencing circuitry combines the scaled signal and the digital DC offset correction signal to provide the output signal; and
   second scaling circuitry having a second scaling factor (1/K) and adapted to scale the output signal to provide a scaled output signal, wherein the configurable digital feedback loop low-pass filters the scaled output signal to provide the second DC offset correction signal when the configurable digital feedback loop is in the tracking mode of operation.

10. The system of claim 8 wherein the configurable digital feedback loop comprises:
    digital low-pass filtering circuitry adapted to low-pass filter the output signal to provide a filtered signal, the digital low-pass filtering circuitry controlled by a control signal such that the filtered signal is held constant when the configurable digital feedback loop is in the hold mode of operation and adjusted when the configurable digital feedback loop is in the tracking mode of operation; and scaling circuitry adapted to scale the filtered signal to provide the digital DC offset correction signal.

11. The system of claim 10 wherein the scaling circuitry has a programmable scaling factor and the configurable digital feedback loop is enabled by setting the programmable scaling factor to a non-zero value and disabled by setting the programmable scaling factor to zero.

12. The system of claim 8 wherein the configurable analog feedback loop comprises:

digital low-pass filtering circuitry adapted to low-pass filter the output signal to provide a filtered signal, the digital low-pass filtering circuitry controlled by a control signal such that the filtered signal is held constant when the configurable analog feedback loop is in the hold mode of operation and adjusted when the configurable analog feedback loop is in the tracking mode of operation;

scaling circuitry adapted to scale the filtered signal to provide a scaled signal; and digital-to-analog conversion circuitry adapted to process the scaled signal to provide the analog DC offset correction circuitry.

13. The system of claim 12 wherein the scaling circuitry has a programmable scaling factor and the configurable analog feedback loop is enabled by setting the programmable scaling factor to a non-zero value and disabled by setting the programmable scaling factor to zero.

14. The system of claim 1 wherein the DC offset correction system operates as a DC notch filter when the at least one of the plurality of nested configurable feedback loops is configured in the tracking mode of operation.

15. The system of claim 1 wherein the training time is a period of time during reception of a radio frequency signal when information communicated in the radio frequency signal according to a communication standard is such that the baseband signal should ideally contain no DC content.

16. The system of claim 1 wherein the wireless receiver operates according to the IEEE 802.11 communication standard and the training time corresponds to at least one of a preamble and header of packet communicated in a radio frequency signal received by the wireless receiver.

17. A method for correcting a DC offset of a wireless receiver comprising:

providing a plurality of nested configurable feedback loops each configurable in either a tracking mode or a hold mode and adapted to track a DC offset of a baseband input signal provided by the wireless receiver to provide a DC offset correction when in the tracking mode and further adapted to hold the DC offset correction constant when in the hold mode; and configuring at least one of the plurality of nested configurable feedback loops in the tracking mode of operation during training time when the baseband input signal should have no DC content.

18. The method of claim 17 further comprising switching the at least one of the plurality of nested configurable feedback loops to the hold mode of operation at or before an end of the training time.

19. A method for removing a DC offset from a baseband signal provided by a wireless receiver comprising:

combining the baseband signal and a first DC offset correction signal to provide a corrected input signal;

combining the corrected input signal and a second DC offset correction signal to provide an output signal;

processing the output signal to provide the first DC offset correction signal during a training time when the baseband signal should ideally contain no DC content;

holding the first DC offset correction signal constant to provide the first DC offset correction signal after the training time;

processing the output signal to provide the second DC offset correction signal during the training time when the baseband signal should ideally contain no DC content; and holding the second DC offset correction signal constant to provide the first DC offset correction signal after the training time.

20. The method of claim 19 wherein processing the output signal to provide the first DC offset correction signal has a larger scale and finer resolution than processing the output signal to provide the second DC offset correction signal.

* * * * *